United States Patent [19]
Lee

[11] Patent Number: 5,890,764
[45] Date of Patent: Apr. 6, 1999

[54] CAR SEAT

[75] Inventor: Chang-Seog Lee, Kyungsangnam-Do, Rep. of Korea

[73] Assignee: Hyundai Motor Company, Seoul, Rep. of Korea

[21] Appl. No.: 891,182

[22] Filed: Jul. 9, 1997

[51] Int. Cl.⁶ .................................................. B60N 2/14
[52] U.S. Cl. .............................. 297/344.22; 297/344.24; 248/349.1; 248/418
[58] Field of Search .................. 297/344.24, 344.22, 297/344.23, 344.25; 248/349.1, 231.61, 425, 418, 415

[56] References Cited

U.S. PATENT DOCUMENTS

| | | | |
|---|---|---|---|
| 2,266,200 | 12/1941 | Hedley | 297/344.22 X |
| 2,587,679 | 3/1952 | Atkinson | 297/344.24 X |
| 3,718,365 | 2/1973 | Gibson | 297/344.24 |
| 4,919,383 | 4/1990 | Benjamin et al. | 248/349.1 |
| 5,292,179 | 3/1994 | Forget . | |
| 5,425,522 | 6/1995 | Retzlaff . | |
| 5,482,354 | 1/1996 | Gryp . | |

FOREIGN PATENT DOCUMENTS

| | | | |
|---|---|---|---|
| 359014532 | 1/1984 | Japan | 297/344.24 |
| 0205522 | 9/1986 | Japan | 248/157 |
| 406262971 | 9/1994 | Japan | 297/344.24 |

*Primary Examiner*—Peter M. Cuomo
*Assistant Examiner*—David E. Allred
*Attorney, Agent, or Firm*—Christie, Parker & Hale, LLP

[57] ABSTRACT

A car seat, which is rotatable and linearly movable. The car seat has a lower plate having a centrally located pinion on the top surface and parallel movable rails on the bottom side. The movable rails are linearly movable on support rails fixed onto the floor of a car body. An upper plate is rotatably connected to the lower plate by a connecting shaft with a predetermined space therebetween and having a seat cushion thereon. A swivel mechanism is provided between the lower and upper plates and is used for adjusting the rotatable position of the upper plate relative to the lower plate. A plurality of locking holes are formed on each of the support rails, while a sliding lever is rotatably mounted to the movable rails and has a stopper selectively locked into or released from the locking holes.

12 Claims, 4 Drawing Sheets

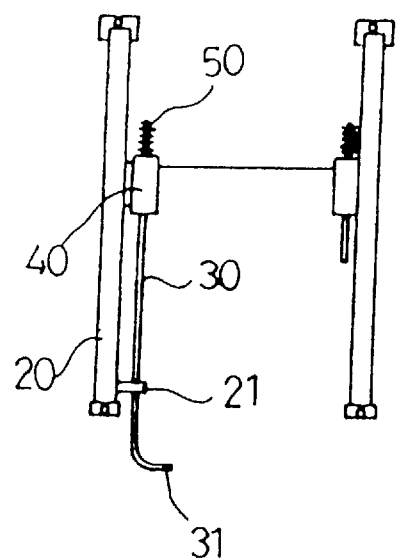

5,890,764

CAR SEAT

BACKGROUND OF THE INVENTION

1. Field of the Invention

The present invention relates, in general, to a car seat and, more particularly, to a car seat capable of rotating at an angle of 360° and capable of having forward and reverse movement to allow passengers and drivers to easily get in and out of automobile.

2. Description of the Prior Art

As well known to those skilled in the art, a conventional car seat which is only adjustable in forward and reverse movement by being fixed on the floor, being inconvenient to the passengers.

Additionally, the car seats can't be rotated, such that the passengers are restricted in their movement while they are in a car. Moreover, passengers have to move laterally and bend their upper bodies while getting in and out of the car with a typical conventional seats.

SUMMARY OF THE INVENTION

In view of the foregoing, an object of the present invention is to provide a swivel system for a car seat in order to allow the seat to be rotated with swift forward and reverse movement, thereby allowing passengers to easily get in and out of an automobile, hence increasing the practicality of entering and exiting the automobile by being more convenient to passengers.

In order to accomplish the above object, the present invention provides a car seat, which comprises a lower plate having a pinion on the top center and parallel movable rails on the bottom side, the movable rails being linearly movable on support rails fixed on the floor of a car body. An upper plate is rotatably connected to the lower plate by a connecting shaft with a predetermined space therebetween, the upper plate having a seat cushion thereon, and a swivel mechanism or rotational mechanism is provided in the space between the lower and upper plates for rotatably adjusting the upper plate relative to the lower plate.

The rotating mechanism is provided between the lower plate and the upper plate and comprises a centrally located pinion coupled to the upper side of the lower plate, a pair of holding arms pivotally coupled to the lower side of the upper plate and partially surrounding the pinion, each holding arm having a rack adjacent an opposite side of the pinion, and a biasing member provided between and coupled to the holding arms for biasing the holding arms together such that the racks engage the pinion.

BRIEF DESCRIPTION OF THE DRAWINGS

The above object, and other features and advantages of the present invention will be more clearly understood from the following detailed description taken in conjunction with the accompanying drawings, in which:

FIG. 7 is a schematic plane view illustrating the mechanism for moving the car seat to the front and back according to this invention.

DESCRIPTION OF THE PREFERRED EMBODIMENT

Figure 1:
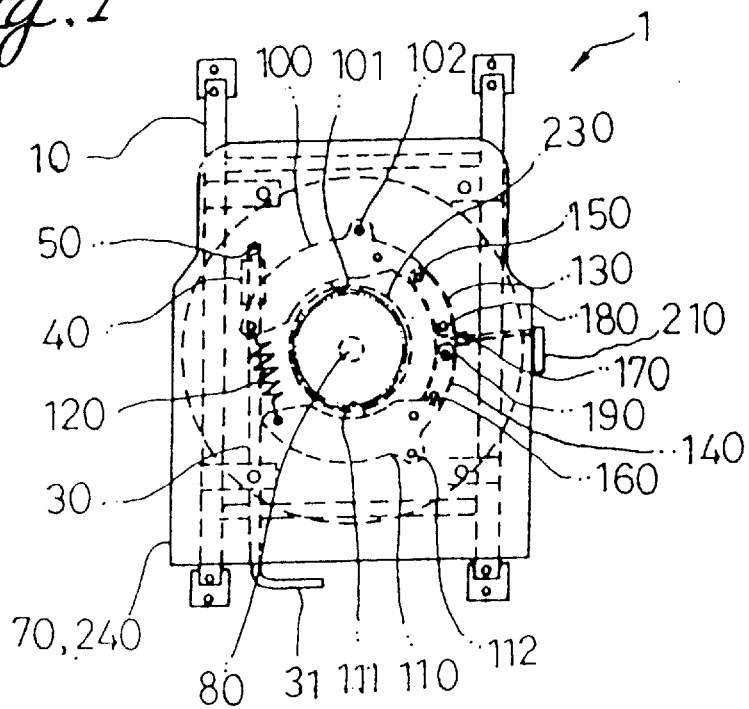
FIG. 1 is a plan view illustrating the structure of a car seat in accordance with the preferred embodiment of the present invention.
Figure 2:
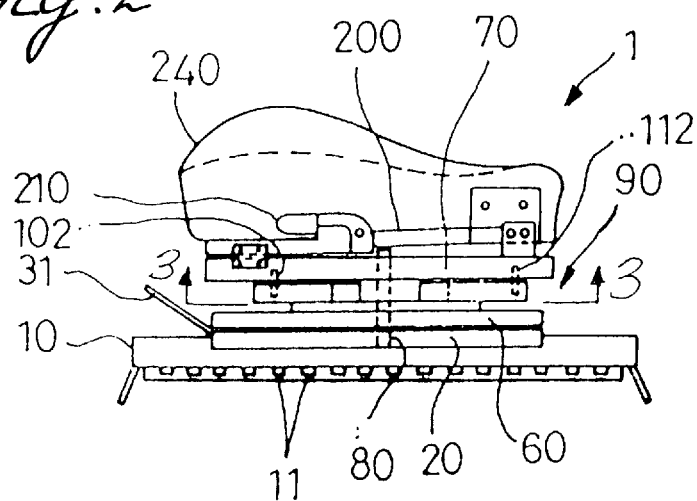
FIG. 2 is a side view illustrating the structure of the car seat according to the embodiment of this invention.

FIGS. 1 to 7 show the structural construction of a car seat according to the preferred embodiment of this invention.

As shown in the drawings, two parallel support rails 10 are mounted and fixed on the floor of a car body (not shown). A plurality of locking holes 11 are formed on the support rails 10 along the length of the rails.

Two movable or slidable rails 20 are mounted on the support rails 10 and are capable of moving to the front and back of the support rails 10. The movable rails 20 are mounted and fixed to the bottom surface of a lower plate 60. A guide bracket 21 is provided on an inner edge of the front of a movable rail 20 and a sliding lever 30 is inserted into the guide bracket 21.

The sliding lever 30 includes a handle 31 at the front end and a stopper 40 at the rear end. The stopper 40 is selectively locked into or released from the locking holes 11 of the support rails 10, to set the movable position of the car seat 1 on the support rails 10. A return spring 50 is provided on the rear end of the stopper 40 so that the seat 1 elastically returns to its original position by the restoring force of the spring 50 when the stopper 40 is released from the locking holes 11.

The lower plate 60, which is fixed to the movable rails 20 as described above, moves to the front or back when the movable rails 20 slide forward or rearward on the support rails 10. A connecting shaft 80 is vertically mounted to the center of the lower plate 60, while a pinion 230 is fixed to the top surface of the lower plate 60. The connecting shaft 80 passes through the center of the pinion 230 and is connected to an upper plate 70.

The upper plate 70 is spaced apart from the lower plate 60 by a predetermined distance and is rotatably mounted to the center of the connecting shaft 80, on which a seat cushion 240 is mounted. A swivel or rotational mechanism 90 is provided between the lower plate 60 and upper plate 70. That is, two holding arms 100 and 110, each of which is rotatable around a fixed hinge pin 102, 112, are symmetrically placed at opposite sides of the pinion 230 and mounted on the bottom surface of the upper plate 70. Racks 101, 111 are formed on the holding arms 100, 110 to engage with teeth formed on the pinion 230. The racks 101, 111 are formed on the holding arms 100, 110 at positions proximate to the pinion 230. The front ends of the holding arms 100, 110 are connected together by means of a return spring or biasing member 120.

Two guide links 130, 140 are connected to the other ends of the holding arms 100, 110 by means of hinge pins 150, 160, respectively. The guide links 130, 140 in turn are connected to one movable link or connecting member 170 by means of hinge pins 180, 190 respectively. A cable 200 is connected to the center of the movable link 170.

The cable 200 is connected to the end of a swivel operating lever 210. The swivel operating lever 210 is pivotally mounted to a hinge pin 220 at a position remote from the upper plate 70.

The above rotatable car seat with forward and reverse movement will be explained below in detail.

Figure 3:
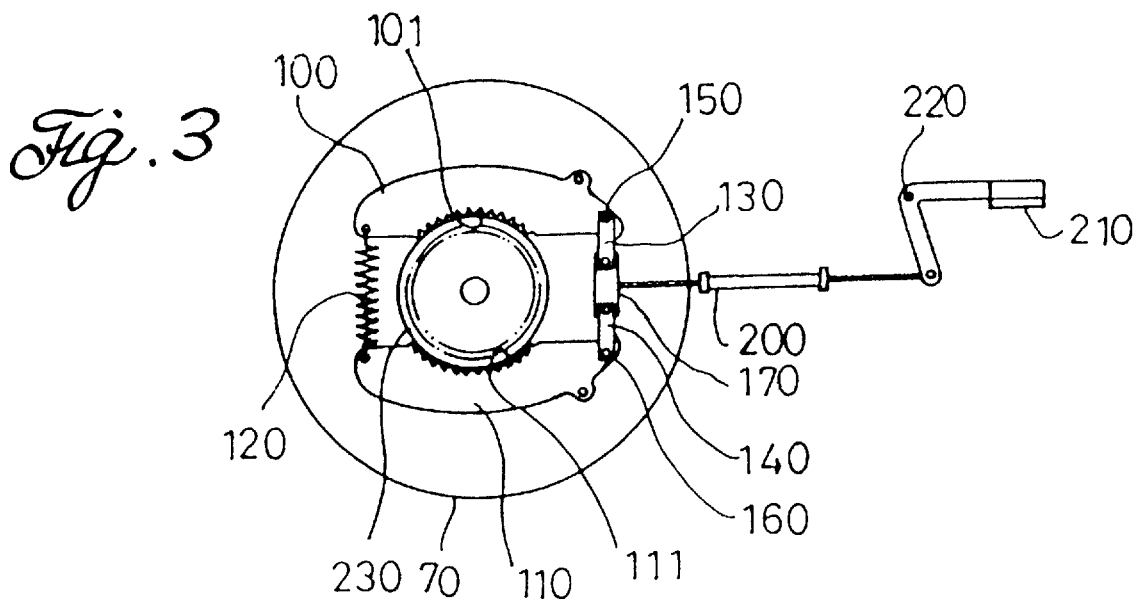
FIG. 3 is a cross-sectional view taken along the line 3—3 of FIG. 2.
Figure 4:
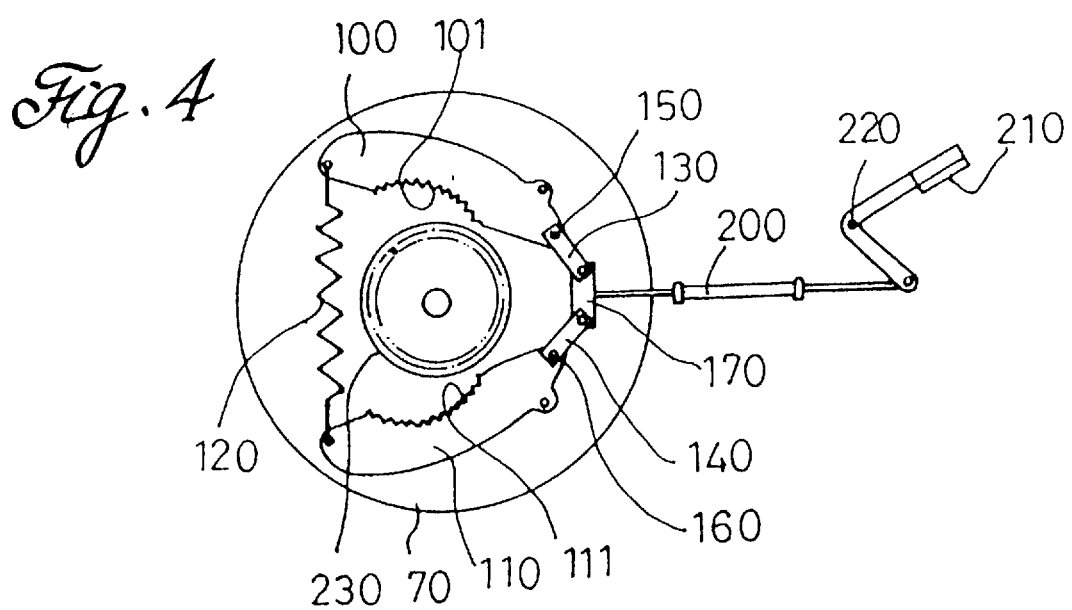
FIG. 4 is a view showing the operation of a swivel mechanism for the car seat of this invention.

Firstly, the rotatable position of the seat 1 is adjusted as shown in FIGS. 3 and 4. In order to rotate the seat 1, a user upwardly pulls the swivel operating lever 210 so that the guide links 130, 140, which are connected to the movable link 170 by hinge pins 180,190, are pulled by the cable 200. By this operation, the guide links 130, 140 pull the holding arms 100, 110 respectively. Therefore, the holding arms 100,110, as shown in FIG. 4, are wide opened about the hinge pins 102, 112 so that the racks 101, 111 disengage from the pinion 230. The upper plate 70 is thus brought into a rotatable state and can be rotated about the connecting shaft 80. In the above state, the user can adjust the rotatable position of the seat 1 by rotating the seat 1 with the upper plate 70 relative to the lower plate 60 in either direction.

Once the seat 1 is rotated to a desirable position, the user releases the swivel operating lever 210 to fix the seat 1 on the rotated position. That is, when the operating lever 210 is free from the external force, the holding arms 100,110 are rotated about the hinge pins 102, 112 by means of the elasticity of the return spring 120, thus returning to their original positions so that the racks 101,111 engage with the pinion 230 again. Also the guide links 130,140, the movable link 170, the cable 200 and the swivel operating lever 210 are all returned to their original positions. Thus the upper plate 70 is fixed to the pinion 230 so that the seat 1 is held fast.

Figure 5:
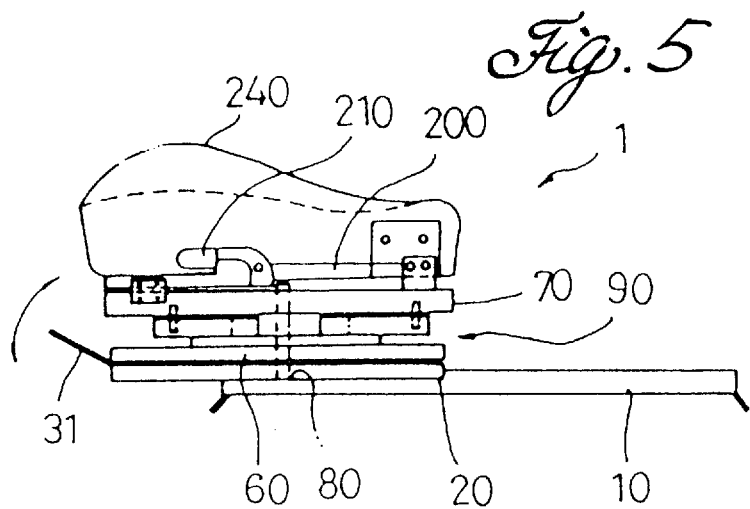
FIG. 5 is a side view showing the forward-moved state of the car seat of this invention.
Figure 6:
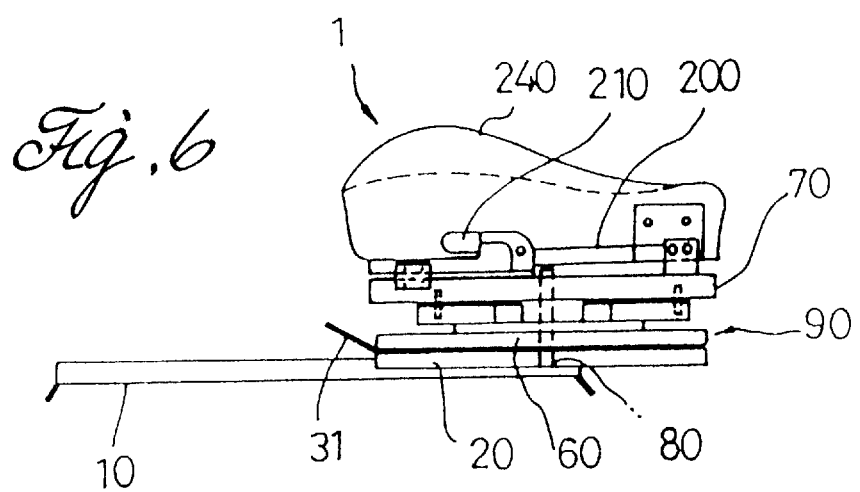
FIG. 6 is a side view showing the rearward-moved state of the car seat of this invention.

In addition, the front or back position of the seat 1 is adjusted as shown in FIGS. 5 and 6. That is, in order to move the seat 1 to the front or back, the user upwardly rotates the handle 31, The rotation of sliding lever 30 inside the bracket 21 releases the stopper 40 from the locking holes 11 of the support rails 10. The movable rails 20, which are provided on the bottom surface of the lower plate 60, are brought into a movable state on the support rails 10. Therefore, the user can adjust the position of the seat 1, by moving the seat 1 to the front or back with the lower part of one's body. When the user moves the seat 1 to the front or back, the movable rails 20 move on the support rails 10 in the same direction so that the seat 1 along with both the lower and upper plates 60, 70 is positioned in a desired position.

After the seat 1 completely moves to the desired position, upon releasing the handle 31, the sliding lever 30 is elastically rotated by the restoring force of the return spring 50, thereby causing the stopper 40 to be locked into selected locking holes 11 of the support rails 10. Thus, the adjusted position of the seat 1 is fixed.

As mentioned above, the present invention allows the seat 1 to be rotated with forward and reverse movement by operation of handles, thereby allowing a passenger to easily get in and out of an automobile, thus increasing the versatility of adjustable position of a car seat making it convenient to the passengers.

What is claimed is:

1. A car seat for a car body having a floor, the car seat comprising:
   a lower plate having a pinion on a top side, and parallel movable rails secured to a bottom side, said movable rails being linearly movable on corresponding support rails adapted to be fixed on the floor of the car body;
   an upper plate spaced apart from and rotatably connected to said lower plate by a connecting shaft, said upper plate having a bottom side and a top side, the top side having a seat cushion mounted thereon;
   a swivel mechanism provided between the lower and upper plates for rotatably adjusting said upper plate relative to said lower plate, said swivel mechanism comprising a pair of holding arms pivotally coupled to the bottom side of the upper plate and partially surrounding the pinion, each holding arm having a rack adjacent an opposite side of the pinion, and a return spring between the holding arms for biasing the holding arms together such that the racks engage the pinion; and
   a swivel lever operatively coupled to the holding arms for selectively disengaging the racks from the pinion to allow rotation of the car seat.

2. The car seat as claimed in claim 1, further comprising:
   a plurality of locking holes formed on each of said support rails along a length of the support rails;
   a slide lever rotatably mounted to said movable rails and having a stopper, said stopper being selectively locked into or released from said locking holes to adjust the linear movable position of the seat.

3. The car seat as claimed in claim 1, wherein the swivel mechanism comprises:
   a plurality of guide links hingedly connected to said holding arms, respective guide links each hingedly connected to respective said holding arm, arms on a side of the pinion opposite the return spring;
   a movable link coupled to said guide links and capable of pivoting the racks toward or away from the pinion in response to actuation of the swivel lever; and
   a cable connecting said movable link to the swivel lever, thus causing the movable link to move when said swivel lever is actuated.

4. The car seat as claimed in claim 1 wherein each of the holding arms comprises a first end, and wherein the return spring is provided between and coupled to the first ends of the holding arms.

5. The car seat as claimed in claim 4 wherein the return spring and the movable link are provided on opposite sides of the pinion.

6. A car seat for a car body having a floor, the car seat comprising:
   a lower plate adapted to be slidably coupled to the floor and having an upper side and a lower side;
   an upper plate spaced apart from and rotatably coupled to the lower plate, and having a lower side;
   a rotating mechanism provided between the lower plate and the upper plate, the rotating mechanism comprising a pinion coupled to the upper side of the lower plate, a pair of holding arms pivotally coupled to the lower side of the upper plate and partially surrounding the pinion, each holding arm having a rack adjacent an opposite side of the pinion, and a biasing member provided between the holding arms for biasing the holding arms together such that the racks engage the pinion; and
   a rotation lever operatively coupled to the holding arms for controlling rotation of the car seat.

7. The car seat as claimed in claim 6 further comprising a pair of sliding rails on opposite sides of the lower side of the lower plate slidably engaging a corresponding pair of support rails adapted to be fixed to the floor of the car body.

8. The car seat as claimed in claim 7 further comprising:
   a plurality of locking holes formed along a length of each of the support rails; and
   a slide lever rotatably coupled to said sliding rails, said slide lever having a stopper for selectively engaging one of the plurality of locking holes to adjust a linear position of the car seat.

9. The car seat as claimed in claim 6 further comprising:
   respective guide links each pivotally coupled to an end of respective said holding arms, opposite the biasing member; and
   a connecting member provided between the guide links and capable of pivoting the racks toward or away from the pinion in response to actuation of the rotation lever.

10. The car seat as claimed in claim 9 further comprising a connecting cable operatively coupling the connecting member to the rotation lever, such that actuation of the rotation lever produces movement of the connecting member.

11. The car seat as claimed in claim 6 wherein each of the holding arms comprises a first end, and wherein the biasing member is provided between and coupled to the first ends of the holding arms.

12. The car seat as claimed in claim 11 wherein the biasing member and the connecting member are provided on opposite sides of the pinion.

* * * * *